E. B. CUTTEN.
Galvanic Battery.

No. 206,166.      Patented July 23, 1878.

Witnesses.
Samuel Snow
C. E. Crane.

Inventor.
Elisha B. Cutten
by his Atty.
Alex L. Hayes.

UNITED STATES PATENT OFFICE.

ELISHA B. CUTTEN, OF BOSTON, MASSACHUSETTS.

IMPROVEMENT IN GALVANIC BATTERIES.

Specification forming part of Letters Patent No. 206,166, dated July 23, 1878; application filed September 17, 1877.

*To all whom it may concern:*

Be it known that I, ELISHA B. CUTTEN, of Boston, in the county of Suffolk and State of Massachusetts, have invented a new and useful Improvement in Galvanic Batteries, of which the following is a full, clear, and exact description, reference being had to the drawings accompanying and forming part of this specification.

This invention is an improvement upon the double fluid-battery. It consists, first, in an improved plan of construction applicable to that form of battery in which the electro-negative metal is covered with a layer of crystals of the salt which is decomposed by the action of the battery, whereby the distance between the electro-positive and electro-negative elements is gradually diminished as the crystals dissolve, thereby diminishing the internal resistance of the cell, and as this diminution of the internal resistance corresponds to the gradual decrease in the electro-motive force of the cell caused by its continued action the current is maintained at a constant strength as long as the battery remains in action; second, in an arrangement of copper and zinc elements, substantially as hereinafter more fully set forth, whereby a compact, portable, and cleanly battery, capable of affording a strong current of constant and uniform strength, is obtained.

Figure 1:
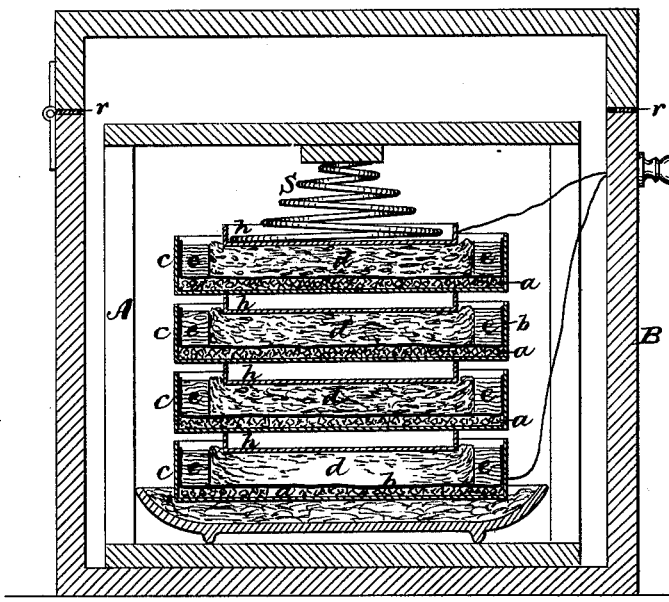
Figure 2:
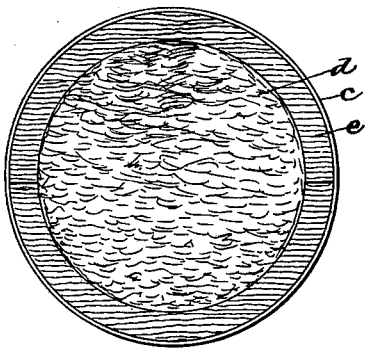

In the accompanying drawings, Figure 1 is a view showing my improved battery in section. Fig. 2 is a plan view.

Referring to Fig. 1, *c c* are a series of copper trays, and *h h* a series of zinc trays. These trays, of which the zinc trays are the smaller, are superimposed one upon the other, copper and zinc alternately, and each zinc is soldered to the bottom of the copper tray above it. The copper trays are filled with crystals of sulphate of copper, *a*, moistened with water, and upon this sulphate of copper, but separated from it by a piece of cloth or paper, *b*, is a layer, *d*, of any suitable absorbent substance, such as sponge or paper-pulp, which is moistened with a saturated solution of sulphate of zinc. Between this layer of porous material may be placed a ring of wood or other suitable substance, for the purpose of preventing the copper and zinc trays from coming in contact; but this ring is not necessary, as the porous layer will be sufficient for this purpose.

A suitable number of trays, according to the strength of battery required, are placed one upon the other, and are then inclosed within a suitable frame, A, and between the uppermost zinc and the top of the frame is a spiral spring, S, which constitutes an auxiliary pressure device, and acts to press the trays closely together. The whole is then inclosed in a box, rendered air-tight, for the purpose of preventing evaporation, by a strip of rubber upon the lid.

When the battery commences to operate the sulphate of copper is decomposed, and, from various well-known causes, the current produced has a tendency to weaken as long as the battery continues in action; but as the zinc and copper trays are caused to approach each other as the sulphate of copper is decomposed, the internal resistance of the battery is correspondingly diminished, and consequently the strength of the current produced remains constant and uniform.

I am aware that a battery composed of alternate copper and zinc trays superimposed one upon the other is not new; but

What I claim as my invention, and desire to secure by Letters Patent of the United States, is—

1. The combination, in a battery, of the electro-positive and electro-negative elements, an intervening body of crystals, and an auxiliary pressure device, for insuring the approach of the elements as the crystals dissolve, as set forth.

2. A galvanic battery composed of a series of alternate copper and zinc trays superimposed one upon the other, and compressed by a spring, S, the copper trays containing sulphate of copper in crystals, and each of the zinc trays soldered to the copper tray above it, and separated from the copper tray below it by a layer of any suitable substance moistened with a solution of sulphate of zinc, substantially as and for the purpose set forth.

In witness whereof I hereunto set my hand this 31st day of August, 1877, in presence of two witnesses.

ELISHA B. CUTTEN.

Witnesses:
 C. E. CRAM,
 A. L. HAYES.